US008054933B2

(12) United States Patent
Tran et al.

(10) Patent No.: US 8,054,933 B2
(45) Date of Patent: Nov. 8, 2011

(54) CHEMICAL INJECTION SYSTEM AND CHEMICAL DELIVERY PROCESS/METHOD OF INJECTING INTO AN OPERATING POWER REACTOR

(75) Inventors: Luong Cam Tran, San Jose, CA (US); Thomas P. Diaz, San Martin, CA (US); Samson Hettiarachchi, Menlo Park, CA (US); Paul Y. Shu, San Jose, CA (US); David P. Siegwarth, San Jose, CA (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 0 days.

(21) Appl. No.: 12/000,717

(22) Filed: Dec. 17, 2007

(65) Prior Publication Data

US 2009/0154636 A1 Jun. 18, 2009

(51) Int. Cl.
*G21C 9/00* (2006.01)
(52) U.S. Cl. ..................... 376/305; 376/306
(58) Field of Classification Search .................. 376/305, 376/306
See application file for complete search history.

(56) References Cited

U.S. PATENT DOCUMENTS

| 5,089,216 A | * | 2/1992 | Schlonski et al. | 376/308 |
| 5,625,656 A | * | 4/1997 | Hettiarachchi et al. | 376/245 |
| 6,198,786 B1 | * | 3/2001 | Carroll et al. | 376/211 |
| 6,335,475 B1 | * | 1/2002 | Nagase et al. | 588/18 |
| 6,473,480 B1 | * | 10/2002 | Kruger et al. | 376/260 |

OTHER PUBLICATIONS

Gonyeau, Joseph, P.E., Salem and Hope Creek Nuclear Power Plants, The Virtual Nuclear Tourist, Mar. 15, 2001, http://www.nucleartourist.com/nj.htm.*
Reyes, J, et al., Testing of the multi-application small light water reactor passive safety systems, Jan. 30, 2007.*
Meyer, V., Practical high-performance liquid chromatography, 2004, Fourth Edition, p. 55.*

* cited by examiner

*Primary Examiner* — Jack Keith
*Assistant Examiner* — Erin M Leach
(74) *Attorney, Agent, or Firm* — Nixon & Vanderhye, P.C.

(57) ABSTRACT

An injection system designed to deliver a chemical solution into a reactor through feedwater system taps during normal operating condition of a power reactor is disclosed. The process of delivery is via positive displacement pumps. Injection of chemical is in a concentrated solution form, which is internally diluted by the system prior to discharging from the skid. The injection system minimizes chemical loss due to deposition on the transit line, enables a higher concentrated solution to be used as the injectant, eliminates the time consuming laborious process of chemical dilution, raises chemical solution to the pressure required for injection, prevents solid precipitations out of solution at the injection pump head through the use of a flush solution, and deposits fresh chemical on new crack surfaces that develop during a power reactor start-up, shutdown and operation.

20 Claims, 3 Drawing Sheets

CHEMICAL INJECTION SYSTEM AND CHEMICAL DELIVERY PROCESS/METHOD OF INJECTING INTO AN OPERATING POWER REACTOR

The present invention relates to nuclear power reactors, and more particularly to an on-line injection system that provides the ability to inject a chemical solution into nuclear power reactors after startup to treat the reactor internals to thereby mitigate intergranular stress corrosion cracking (IGSCC).

BACKGROUND OF THE INVENTION

It is known to use noble metal chemicals in conjunction with hydrogen gas injection to mitigate intergranular stress corrosion cracking (IGSCC) in nuclear power reactors. As a catalyst, noble metal solution is injected into a reactor to assist in the recombination of oxygen and hydrogen. Delivery of noble metals for power reactors is typically done during hot standby, mode 3. No power is generated during this mode when the noble metal is being injected, resulting in a substantial loss of expensive critical path time.

In addition, during the startup period of a power reactor, hydrogen cannot be injected with the current system configuration. Under the normal water chemistry conditions, an insufficient concentration of hydrogen is available to recombine with radiolytic oxygen. As a consequence, any existing crack will propagate, leading to a portion of the crack that is not treated with noble metal, and hence not mitigated against IGSCC. The on-line injection system of the present invention solves this problem by providing the ability to inject a chemical solution after reactor startup to treat the reactor internals.

Several attempts were made in the chemical delivery process to a power reactor during normal operation. Although each attempt was relatively successful in its outcome, there were major setbacks and improvements with each attempt.

Since main steam line radiation increase is a concern with injecting chemical solutions into the reactor, the injection amount used was very closely monitored with the process controller. The initial injection solution needed to be very dilute to minimize its effect on main steam. With a diluted solution, the storage tank was frequently depleted, requiring multiple labor intensive mixing processes to refill the storage tank. The dilution process was also required every time a concentration change is needed.

To avoid performing the cumbersome solution mixing process, a higher solution concentration was used. However, a higher concentration equates to an increase in the solution's aggressive characteristic, which may have adverse effects on the wetted components of the pump interior. Along with the harsh ambient temperature of 100+° F. in the reactor turbine building, the conventional off-the-shelf injection pumps (several manufacturer tested) failed within hours of operation.

Another concern with the delivery process is loss of chemical due to deposition in the transit line. A shorter residence time in the line would result in less chemical loss. With limited control over volume, boosting the volumetric discharge flowrate with a DI water stream decreased solution residence time in the transit line. This approach also allowed auto-dilution of the chemical, a new feature added to the injection skid.

The on-line injection system of the present invention overcomes the adversities described above to provide uninterrupted delivery of chemical solution into an operating power reactor.

BRIEF DESCRIPTION OF THE INVENTION

The injection system of the present invention is designed to deliver a chemical solution into a power reactor through various primary or auxiliary system (Feedwater, Recirculation, RWCU, etc.) tap(s) during a normal operating condition of the power reactor. The process of delivery is via positive displacement pumps. The injection of chemicals is in a concentrated solution form, which is internally diluted by the system prior to discharging from the skid. This method of chemical delivery using the injection system achieves several important accomplishments. First, it minimizes chemical loss due to deposition on the transit line. Second, it enables a higher concentrated solution to be used as the injectant. Third, it eliminates the time consuming laborious process of chemical dilution. Fourth, it raises the chemical solution to the pressure required for injection. Fifth, it prevents solid precipitations out of solution at the injection pump head through the use of a specially prepared unique flush solution. And, finally, on-line injection deposits fresh chemical on new crack surfaces that may develop during a power reactor start-up, shutdown and operation.

DETAILED DESCRIPTION OF THE INVENTION

Figure 1:
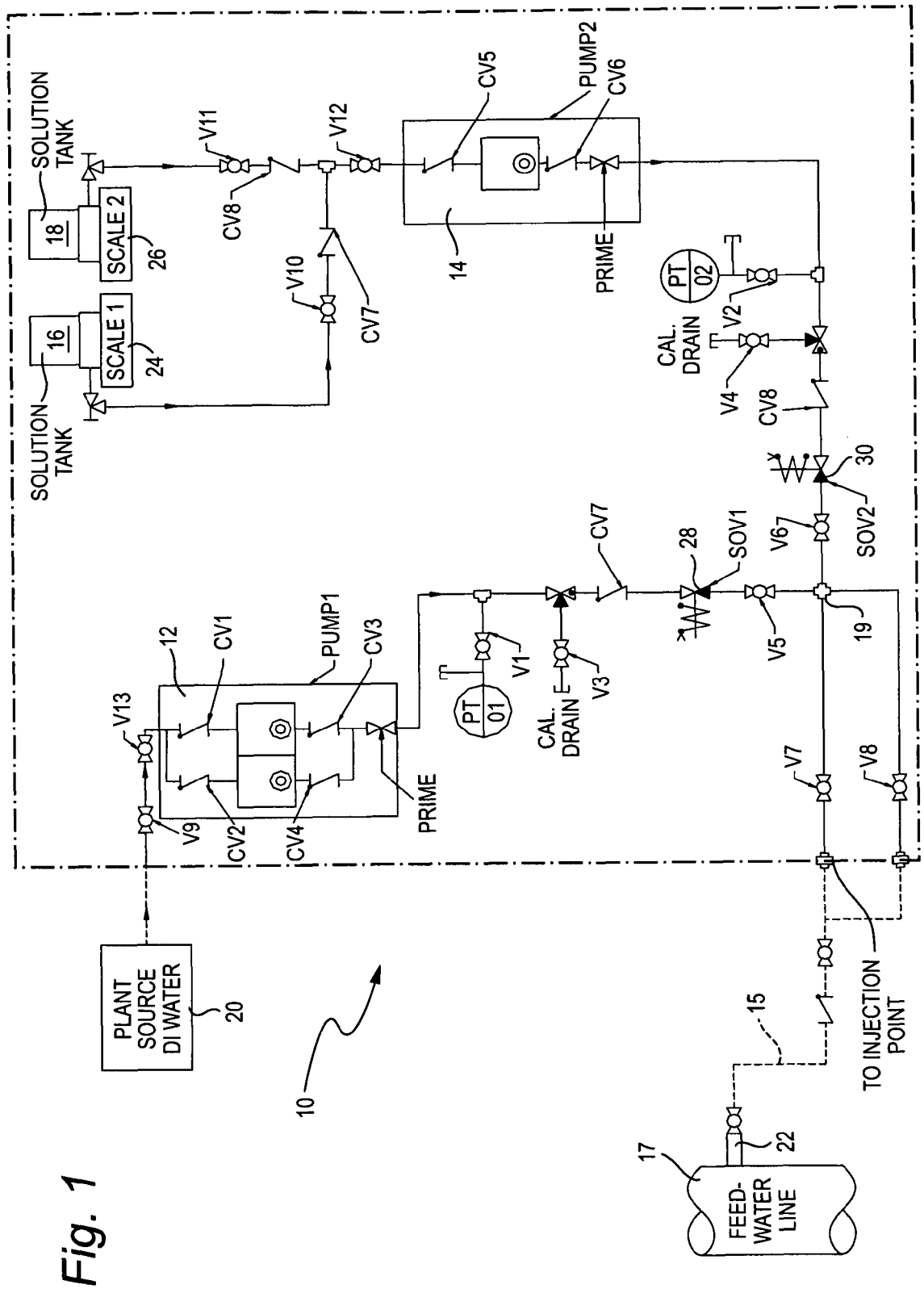
FIG. 1 is a schematic flow diagram of the on-line injection system of the present invention.

FIG. 1 is a schematic flow diagram of an on-line injection system 10 used to inject a chemical solution into an operating reactor (not shown) to mitigate intergranular stress corrosion cracking. The system 10 includes two injection pumps, 12 and 14, operating in unison. One pump 14 pumps a concentrated chemical solution from alternative ones of two makeup tanks 16 or 18, while the other pump 12 assists in shortening the chemical solution delivery time by diluting the solution with DI water from a plant source 20. The discharges of both pumps 12 and 14 are combined and mixed at line junction 19 prior to exiting the skid and being injected into the reactor, i.e., via the feedwater line 17. This dilution of the chemical solution accomplishes the task of reducing the residence time of the chemical within the transit tubing 15, while facilitating the dilution of the solution.

The system 10 injects the chemical solution into either a primary or auxiliary system through tap 22. Pumps 12 and 14 are positive displacement pumps that are used to regulate the injection capacity, thus providing control over the rate of injecting the chemical solution into the reactor. The amount of chemical solution injected into the reactor from one of the solution tanks 16 or 18 is tracked by gravimetric method using a load cell 24 or 26, respectively. An analog or digital signals 27 or 29 of the chemical solution weight loss is used by a data acquisition system 25 to calculate the rate at which the chemical is being pumped from the solution tanks 16 and 18. Thus, system 10 achieves injection control of the chemical solution into the reactor 17 through the use of electronic balances interfaced with load cells 24 and 26 and the transmission of chemical solution weight loss data through signals 27 or 29 to data acquisition system 25.

Figure 2:
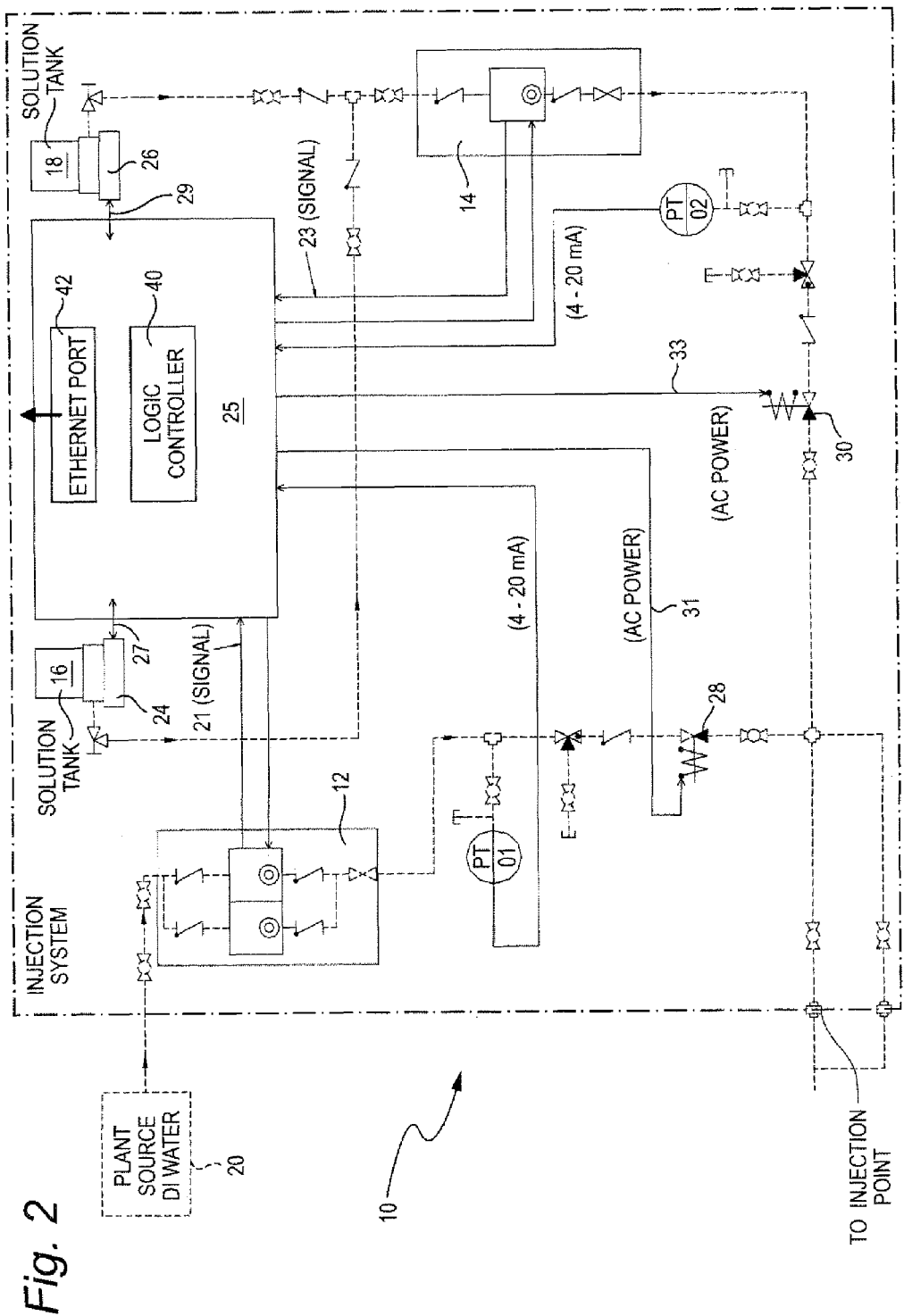
FIG. 2 is a schematic diagram showing the interlocking signals of a logic controller for the on-line injection system of FIG. 1.

As shown in FIG. 2, the injection pumps 12 and 14 and isolation valves 28 and 30 are interlocked through the use of a logic controller 40 to turn off chemical injection upon a shutdown condition. Logic controller 40 communicates with pumps 12 and 14 through signal lines 21 and 23, respectively, and controls isolation valves 28 and 30 through AC power lines 31 and 33, respectively. Alarm signals are used to notify the operators, locally or remotely, through Ethernet port 42, that the system 10 is in an undesirable condition and has the potential of being automatically isolated. Normally-closed automatic isolation valves 28 and 30 are located downstream of the injection pumps 12 and 14. There, valves 28 and 30 close upon a trip signal, loss of signal, or a loss of power. There is the capability of viewing the system conditions through a connection at remote locations with an Ethernet line connected to Ethernet port 42. All alarms are displayable via this remote connection. The logic controller 40 provides the following alarm signals:

a. High pressure—warning of pressure approaching shutdown condition;
b. Low solution—notifies operator that chemical solution in tank is low;
c. High flow rate—condition where chemical injection rate differs from set rate;
d. Low flow rate—condition where chemical injection rate differs from set rate.

The logic controller 40 also provides the following Shutdown signals:

a. High pressure—protection of equipment and personnel;
b. Low pressure—indicator of a line break; system isolates;
c. Pump fault—system isolates upon a pump failure;
d. Low-Low solution—chemical solution tank empty, pumps stop, valves isolate.

The novel feature of system 10 is its ability to inject a chemical solution with a wide range of pH, while a reactor is operating at full power and temperature. The on-line injection process provides the capability to monitor and control the chemical injection for an optimal application. The selected injection rate is dependent on main steam line radiation ("MSLR") increases, concentration of the chemical solution in the reactor water and deposited on the internal surfaces of the reactor, and corrosion potential as read by electrochemical corrosion potential ("ECP") probes within the reactor.

The chemical injection rate of injection system 10 can be expressed as follows:

$$\text{Injection Rate} = f(\text{MSLRM}, C_w, C_s, \text{ECP})$$

Where MSLRM=Main Steam Line Radiation Monitor; $C_w$=Chemical concentration dissolved in reactor water; $C_s$=Chemical concentration deposited on surfaces; and ECP=Electrochemical Corrosion Potential.

The injection of the chemical solution into the power reactor is maintained at low, but steady concentration. A direct injection of the targeted concentration would require multiple laborious mixing steps or an extremely large solution storage container. The internal dilution capability of the injection system 10 performed using pumps 12 and 14 allows the use of a concentrated solution to be metered into a higher flowing DI water stream. The diluted discharge stream has a shortened residence time, resulting in minor line loss of the injected chemical, while sufficiently delivering the required amount to the reactor.

Figure 3:
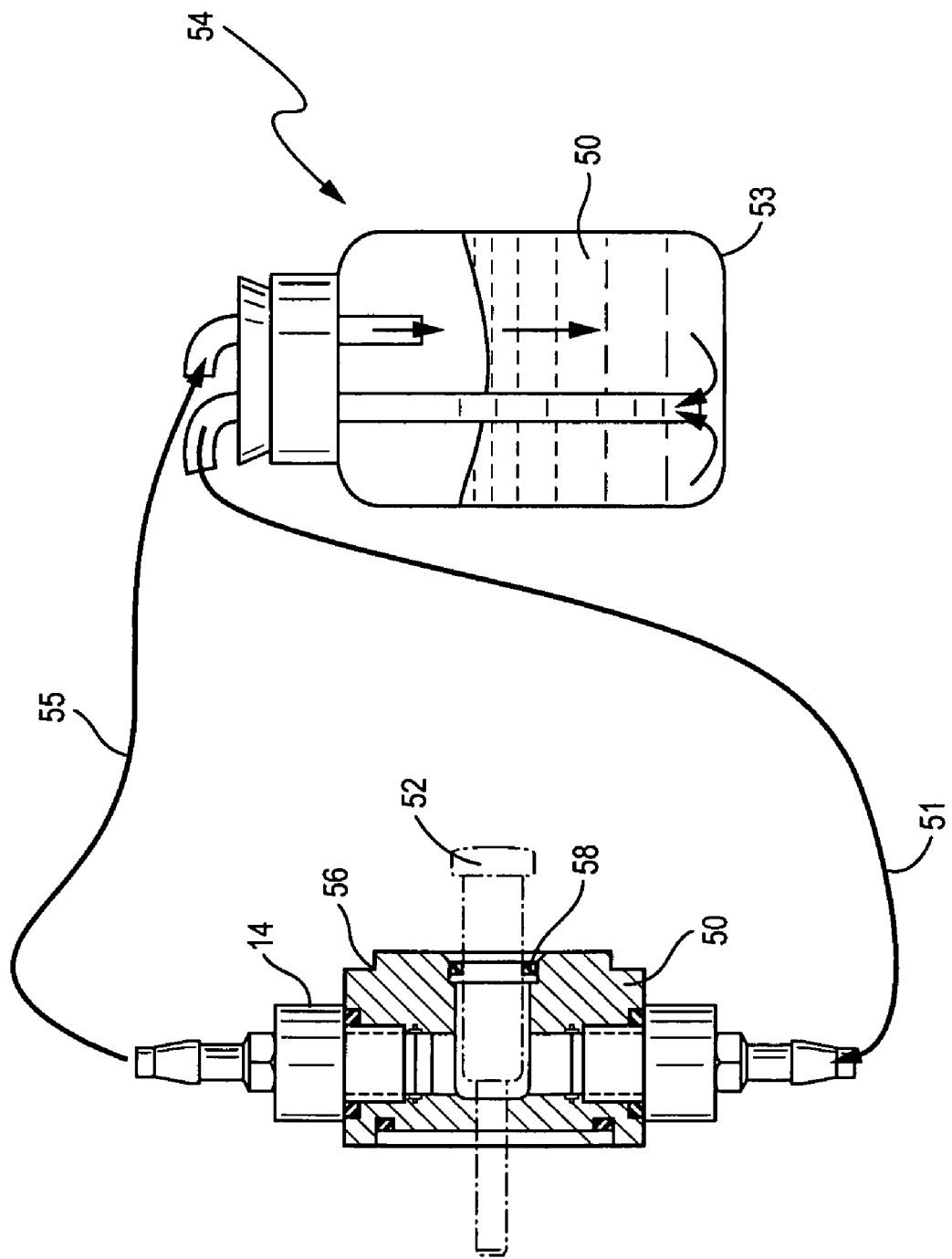
FIG. 3 is a drawing of a system for injecting a flush solution, which permits the proper functioning of the injection pump used to inject a chemical solution into an operating reactor.

To maintain continuous injection of the chemical solution, as required by the on-line injection process of system 10, it is essential to prevent solid deposition and precipitation on components of the injection pump 14. For this purpose, a novel buffer solution 50 is provided to flush the wetted moving parts of injection pump 14. A recirculation and storage system 54 for storing and circulating the buffer solution 50 through pump 14 is shown in FIG. 3. System 54 includes a canister 53 for storing the buffer solution 50 and lines 51 and 55, respectively, for delivering the solution 50 to a flush housing 56 surrounding piston 52 of pump 14 and returning solution 50 to canister 53. Flush housing 56 contains a portion of solution 50 and a flush seal 58 to prevent the solution 50 from leaking out of housing 56. The flush solution 50 consists of sodium carbonate and sodium bicarbonate powder in a 1:1 ratio (0.025 equal molar of each), resulting in a solution of pH~10. Without the buffer flush solution 50, solids precipitate out of the chemical solution to crud the injection pump 14 piston and seals. This causes an increased friction on the moving parts that leads to sticking of the reciprocating piston 52, which deteriorate the seal and eventually result in total failure of the pump 14. It is critical that the specific tested buffer flush solution 50 be used to avoid system failure shutdown. The use of conventional flush solutions, such as water, methanol, ethanol, isopropanol, glycerin or sodium hydroxide, has resulted in pump failures due to deposition from the chemical injectant on the piston and the seals of pump 14. Therefore, the specially formulated flush solution, as described above, is used for successful injection of noble metals into a reactor without interruption.

The Injection system 10 will deliver a chemical solution, e.g., alcohol, hydrazine, titanium, zirconium, tungsten, tantalum, vanadium and, in particular, a platinum compound $[Na_2Pt(OH)_6]$, into the reactor vessel during power operation of the reactor. The higher temperature and higher fluid velocities during power operation enhance the penetration of the catalyst into the reactor cracks and crevices. Thus, the Pt transport conditions, which enhance the diffusion of the Pt compound into reactor cracks and crevices, preferably match the oxidant penetration conditions of the reactor.

A typical time period for an on-line injection of a chemical solution into an operating reactor is preferably about 1 to 3 weeks. This longer time period is also better suited to enhance the convection, eddy and diffusion transport of the chemical injectant into the cracks and crevices of a reactor. The chemical injection rates are preferably low, so that the reactor water chemical concentration during the application is kept at parts per trillion (ppt) to low parts per billion ("ppb") levels and the conductivity increase is marginal.

Because there may be MSLRM increases associated with the on-line process; preferably, a few preliminary short term (approximately 4 hours duration) chemical injection step tests at incremental addition rates are performed prior to any long term steady-state injection periods. The preliminary injection rates allow the selection of the continuous injection rate that is within the plant operating dose rate ($N^{16}$) guidelines.

The requirements for the chemical injection system and chemical delivery process/method of injecting into an operating power reactor according to the present invention are set forth below.

Plant Operating Requirements
    The required operating conditions for the on-line application are as follows:
    Reactor operating mode is preferably >70% power.
    Core flow is preferably >85%.
Application Duration
    Duration of platinum chemical injection is preferably 7 to 21 days.

Reactor Water Conductivity

Reactor water conductivity during the injection period is preferably <0.3 µS/cm, with an upper limit of <1.0 µS/cm.

Process Control

Process control is by mass of the chemical species injected for each application over 7 to 21 days. The injection rate is dependent on the $N^{16}$ response of a specific plant as determined by the initial $N^{16}$ step tests. The rate may, in part, be additionally controlled by reactor water injectant concentration (i.e., 100 ppt platinum in reactor water desired), and conductivity increase limitations.

Chemical Input for Subsequent Re-Applications

Periodic re-applications are preferably conducted at six- to twelve-month intervals. If a plant experiences an extended off-hydrogen period, the on-line process should be re-applied as soon as practical following such an event. The mass injected at that time should be the same as the initial application.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An injection system for injecting a chemical solution into a nuclear power reactor while the reactor is in a normal operating condition to treat the reactor's internal surfaces, cracks and crevices with one or more chemical species, and thereby mitigate intergranular stress corrosion cracking, the injection system comprising:

a vessel external to the reactor that stores the concentrated chemical solution for mitigating intergranular stress corrosion cracking in the reactor's internal surfaces, first and second valves external to the reactor and connectable to a common transit tube that, in turn, is connectable to the reactor's injection tap through which feedwater enters the reactor, a first injection pump external to the reactor and connected between the vessel and the first valve that pumps the concentrated chemical solution from the vessel through the first valve into the common transit tube connected to the reactor's injection tap, an apparatus external to the reactor and supporting the vessel that measures by gravimetric method the rate at which the concentrated chemical solution is pumped from the vessel by the first injection pump, a source of deionized water external to the reactor, a second injection pump external to the reactor and connected between the source of deionized water and the second valve that pumps the deionized water from the source of said water through the second valve into the common transit tube, to dilute the concentrated chemical solution within the common transit tube before it is injected into the reactor, the first and second injection pumps pumping the concentrated chemical solution and the deionized water, respectively, into the common transit tube, causing the diluted chemical solution to be fed through the reactor's injection tap into the power reactor's internals during normal operation of the power reactor, and a logic controller external to the reactor and connected to the external gravimetric measuring apparatus, the first and second injection pumps and the first and second valves, the logic controller receiving from the external gravimetric measuring apparatus chemical solution weight loss measurements and using the measurements to calculate the rate at which the concentrated chemical solution is pumped from the vessel to control the first and second valves and the first and second injection pumps and thereby control the rate at which the diluted chemical solution is injected into the power reactor, the logic controller injecting the diluted chemical solution into the reactor at a rate whereby the reactor water chemical concentration during application is kept at parts per trillion levels and the conductivity increase is at a level that enhances the convection, eddy and diffusion transport of the injected chemical into the cracks and crevices in the reactor.

2. The injection system of claim 1, wherein the chemical species are selected from the group consisting of platinum, alcohol, hydrazine, titanium, zirconium, tungsten, vanadium and tantalum.

3. The injection system of claim 1 further comprising a recirculation and storage system, external to the reactor, that stores and circulates a buffer solution through the first injection pump to flush the first injection pump's wetted moving parts to prevent solid deposition and precipitation on components of the first injection pump, the system comprising a canister for storing the buffer solution, a sealed flush housing surrounding a piston of the first injection pump and lines for delivering the solution to the flush housing and for returning the solution to the canister.

4. The injection system of claim 3, wherein the buffer solution consists of sodium carbonate and sodium bicarbonate powder in a 1:1 ratio, resulting in a flush solution with 0.025 equal molar of each and with a pH~10.

5. The injection system of claim 1, wherein the first and second injection pumps are positive displacement pumps that regulate injection capacity-to control the rate of injection of the diluted chemical solution into the reactor.

6. The injection system of claim 1, wherein the apparatus for determining the rate at which the concentrated chemical solution is being pumped from the solution vessel includes at least one load cell that measures a reduction in weight of the amount of chemical solution stored in the vessel using a gravimetric method.

7. The injection system of claim 6, wherein the apparatus that determines the rate at which the concentrated chemical solution is pumped from the solution vessel is further comprised of a data acquisition system that calculates the chemical solution weight reduction using a signal from at least one load cell.

8. The injection system of claim 1, wherein the injection rate is a function of increases in the reactor's main steam line radiation, concentration of the chemical solution in the reactor's water and chemical species deposited on the reactor's internal surfaces, and corrosion potential measured by at least one electrochemical corrosion potential ("ECP") probe.

9. The injection system of claim 1, wherein the chemical solution injected into the reactor is either a noble metal, alcohol, hydrazine, titanium, zirconium, tungsten, tantalum, vanadium or any combination thereof.

10. The injection system of claim 1, wherein the logic controller controls the injection of the diluted chemical solution into the reactor vessel over a time period of about 1 to 3 weeks.

11. The injection system of claim 1, wherein the chemical solution injected into the reactor is a solution of a platinum compound.

12. The injection system of claim 11, wherein the logic controller controls the injection rate of the platinum compound into the reactor vessel through the feedwater system so that the rate is less than 10 g/h.

13. The injection system of claim 11, wherein the logic controller controls the injection rate of the platinum compound into the reactor vessel through the feedwater system so that the rate is less than 4 g/h.

14. The injection system of claim 11, wherein the logic controller controls the injection rate of the platinum compound into the reactor vessel according to the platinum compound's concentration in, and the conductivity of the reactor's water.

15. The injection system of claim 14, wherein the platinum compound is $Na_2Pt(OH)_6$ and its concentration in the reactor's water is 500 ppt, and wherein the reactor's water conductivity during injection of the chemical solution into the reactor vessel is maintained at a level of less than 0.3 $\mu$S/cm, and not to exceed 1.0 $\mu$S/cm.

16. The injection system of claim 14, wherein the platinum compound is $Na_2Pt(OH)_6$ and its concentration in the reactor's water is less than 100 ppt and wherein the reactor's water conductivity during injection of the chemical solution into the reactor vessel is maintained at a level of less than 0.3 $\mu$S/cm, and not to exceed 1.0 $\mu$S/cm.

17. The injection system of claim 14, wherein the platinum compound is re-injected into the reactor at six-month to twelve-month intervals.

18. The injection system of claim 14, wherein the deposition of the platinum compound on the reactor vessel's inner surfaces is at least 0.001 $\mu$g/cm$^2$.

19. The injection system of claim 14, wherein the deposition of the platinum compound on the reactor vessel's inner surfaces is greater than 0.01 $\mu$g/cm$^2$.

20. An injection system for injecting a diluted chemical solution into a nuclear power reactor while the reactor is operating at full power and temperature to treat the reactor's internal surfaces causing intergranular stress corrosion cracking to be mitigated, the injection system comprising:

at least one tank external to the reactor that stores a concentrated chemical solution that will be injected into the reactor for mitigating intergranular stress corrosion cracking in the reactor's internal surfaces, first and second valves external to the reactor and connectable to a transit tube that is connectable to the reactor's tap for the feedwater system, a first injection pump external to the reactor and connected between the at least one tank and the first valve that pumps the concentrated chemical solution from the at least one tank and that meters the concentrated chemical solution's flow through the first valve into the transit tube, at least one load cell external to the reactor and supporting the at least one tank that determines reductions in the weight of the concentrated chemical solution stored in the at least one tank in response to the solution being pumped from the at least one tank by the first injection pump, a source of deionized water external to the reactor, a second injection pump external to the reactor and connected between the source of deionized water and the second valve that pumps the deionized water from the source of said water and that meters the deionized water's flow through the second valve into the transit tube to dilute the concentrated chemical solution in the transit tube before it is injected into the reactor, and causing the residence time of the chemical solution within the transit tube before delivery of the solution to the reactor to be reduced, the first and second pumps pumping the concentrated chemical solution and the deionized water, respectively, to the transit tube, causing the diluted chemical solution to be fed through the reactor's feedwater injection tap into the power reactor's internals during normal operating condition of the power reactor, a logic controller external to the reactor and connected to the at least one load cell, the first and second injection pumps and the first and second valves, the logic controller receiving from the least one load cell weight chemical solution loss measurements and using the measurements to calculate the rate at which the concentrated chemical solution is pumped from the at least one tank to thereby control the first and second valves and the first and second injection pumps and thereby control the rate at which the diluted chemical solution is injected into the power reactor's feedwater injection tap, the logic controller injecting the diluted chemical solution into the reactor at a rate whereby the reactor water concentration during application is kept at parts per trillion levels and the conductivity increase is at a level that enhances the convection, eddy and diffusion transport of the injected chemical into the cracks and crevices in the reactor, and a recirculation and storage system external to the reactor that stores and circulates through the first injection pump a buffer solution to flush the first injection pump's wetted moving parts to prevent solid deposition and precipitation on components of the second injection pump, the system comprising a canister for storing the buffer solution, a sealed flush housing surrounding a piston of the first injection pump and lines for delivering the solution to the flush housing and for returning the solution to the canister.

* * * * *